(12) United States Patent
Prakash et al.

(10) Patent No.: US 11,604,662 B2
(45) Date of Patent: Mar. 14, 2023

(54) SYSTEM AND METHOD FOR ACCELERATING MODERNIZATION OF USER INTERFACES IN A COMPUTING ENVIRONMENT

(71) Applicant: Virtusa Corporation, Southborough, MA (US)

(72) Inventors: Div Prakash, Foxboro, MA (US); Anuradha Dias Karunarathne Weeraman, Battaramulla (LK); Subin George Palackaparampil, Kottayam (IN)

(73) Assignee: Virtusa Corporation, Southborough, MA (US)

( * ) Notice: Subject to any disclaimer, the term of this patent is extended or adjusted under 35 U.S.C. 154(b) by 123 days.

(21) Appl. No.: 17/235,453

(22) Filed: Apr. 20, 2021

(65) Prior Publication Data
US 2022/0334853 A1    Oct. 20, 2022

(51) Int. Cl.
*G06F 8/30* (2018.01)
*G06F 9/451* (2018.01)

(52) U.S. Cl.
CPC ............. *G06F 9/451* (2018.02); *G06F 8/30* (2013.01)

(58) Field of Classification Search
CPC ..... G06F 8/30; G06F 8/34; G06F 8/40; G06F 8/447; G06F 8/51
See application file for complete search history.

(56) References Cited

U.S. PATENT DOCUMENTS

| | | | |
|---|---|---|---|
| 8,499,276 B2 * | 7/2013 | Kooy | G06F 8/38 717/100 |
| 10,140,105 B2 * | 11/2018 | Kellicker | G06F 8/51 |
| 2007/0094609 A1 * | 4/2007 | Gilboa | G06F 8/51 707/999.102 |
| 2016/0034276 A1 * | 2/2016 | Webb | G06F 21/105 717/135 |

\* cited by examiner

*Primary Examiner* — Duy Khuong T Nguyen
(74) *Attorney, Agent, or Firm* — Danielson Legal LLC (57) ABSTRACT

A system and method for accelerating modernization of user interfaces in a computing environment is disclosed. The method includes receiving request for transforming a current graphical user interface (GUI) corresponding to current programming language and associated software framework to a target GUI corresponding to target programming language and associated software framework. The method includes capturing run time application attributes during an active interactive session of the user interface with user devices. Further, the method includes determining static application attributes from the source code of the current application. The method includes generating application attribute model representing relationships between static application attributes and run time application attributes. The method further includes automatically generating a target application attribute model corresponding to the target programming language and associated software framework based on the application attribute model. Also, the method includes generating a set of executable program code and non-executable assets corresponding to the target programming language and associated software framework based on the target application attribute model. Furthermore, the method includes outputting the generated set of executable program code and non-executable assets on a user interface of the user device.

20 Claims, 8 Drawing Sheets

SYSTEM AND METHOD FOR ACCELERATING MODERNIZATION OF USER INTERFACES IN A COMPUTING ENVIRONMENT

FIELD OF INVENTION

Embodiments of a present disclosure relate to computing systems and more particularly to a system and a method for accelerating modernization of user interfaces in a computing environment.

BACKGROUND

Modernization from legacy technology to new technology is often requiring significant manual intervention. Manual work is error-prone due to the size of large legacy software that cannot be fully managed by a human mind (complexity, volume of algorithms and information). Hundreds and even thousands of man-days are required to modernize average legacy software.

Transformations applied for modernizing software are similar to decompiling and recompiling programming languages. Therefore, it is highly complex or even impossible for users of modernization systems (methods, tools, and the like), to customize transformations. As a consequence, it is very difficult to modernize all the legacy code because of ambiguities in legacy code semantics and numerous exceptions to design patterns.

Hence, there is a need for an improved system and a method for auto generating code in a desired language in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a system for accelerating modernization of user interfaces in a computing environment is disclosed. The system includes one or more hardware processors and a memory coupled to the one or more hardware processors. The memory includes a plurality of subsystems in the form of programmable instructions executable by the one or more hardware processors. The plurality of subsystems includes a request handler subsystem configured for receiving a request for upgrading a current graphical user interface corresponding to a current programming language and associated software framework to a target graphical user interface corresponding to a target programming language and associated software framework the plurality of subsystem further includes a run time application attribute capturing subsystem configured for capturing one or more run time application attributes associated with the current graphical user interface of a web application during an ongoing communication session with one or more user devices. Furthermore, the plurality of subsystem includes a static application attribute determination subsystem configured for determining one or more static application attributes associated with the graphical user interface of the web application from one or more data sources. The one or more static application attributes corresponds to the current programming language and associated software framework. Further, the plurality of subsystem includes an application attribute model generator subsystem configured for generating an application attribute model representing relationships between the one or more static application attributes and the one or more run time application attributes. The application attribute model corresponds to the current programming language and associated software framework. Also, the plurality of subsystem includes a target application attribute model generator subsystem configured for automatically generating a target application attribute model corresponding to the target programming language and associated software framework based on the generated application attribute model. Also, the plurality of subsystem include a program code generator subsystem configured for generating a set of executable program code corresponding to the target programming language and associated software framework based on the generated target application attribute model. Additionally, the plurality of subsystem includes an output subsystem configured for outputting the generated set of executable program code along with non-executable assets on a user interface of the user device.

In accordance with another embodiment of the present disclosure, a method for accelerating modernization of user interfaces in a computing environment is disclosed. The method includes receiving a request for upgrading a current graphical user interface corresponding to a current programming language and associated software framework frameworks to a target graphical user interface corresponding to a target programming language and associated software framework frameworks. The method further includes capturing one or more run time application attributes associated with the current graphical user interface of a web application during an ongoing communication session with one or more user devices. Further, the method includes determining one or more static application attributes associated with the graphical user interface of the web application from one or more data sources. The one or more static application attributes corresponds to the current programming language and associated software framework. Additionally, the method includes generating an application attribute model representing relationships between the one or more static application attributes and the one or more run time application attributes. The application attribute model corresponds to the current programming language and associated software framework. The method further includes automatically generating a target application attribute model corresponding to the target programming language and associated software framework based on the generated application attribute model. Also, the method includes generating a set of executable program code corresponding to the target programming language and associated software framework based on the generated target application attribute model. Furthermore, the method includes outputting the generated set of executable program code along with non-executable assets on a user interface of the user device.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

Throughout this document, the terms browser and browser application may be used interchangeably to mean the same thing. In some aspects, the terms web application and web app may be used interchangeably to refer to an application, including metadata, that is installed in a browser application. In some aspects, the terms web application and web app may be used interchangeably to refer to a website and/or application to which access is provided over a network (e.g., the Internet) under a specific profile (e.g., a website that provides email service to a user under a specific profile). The terms extension application, web extension, web extension application, extension app and extension may be used interchangeably to refer to a bundle of files that are installed in the browser application to add functionality to the browser application. In some aspects, the term application, when used by itself without modifiers, may be used to refer to, but is not limited to, a web application and/or an extension application that is installed or is to be installed in the browser application.

Embodiments of the present disclosure disclose a system and method for management of the computing assets. The present disclosure simplifies the process of user interface (UI) modernization by providing a toolchain to capture the dynamic attributes (at runtime) of a web application. These dynamic attributes are then coupled with the static attributes (in the source code) which are then used to generate code, test cases, and documentation to aid in the transformation effort and to reduce the effort of migration and improve time to market.

Referring now to the drawings, and more particularly to FIG. 1 through 8, where similar reference characters denote corresponding features consistently throughout the figures, there are shown preferred embodiments and these embodiments are described in the context of the following exemplary system and/or method.

Figure 1:
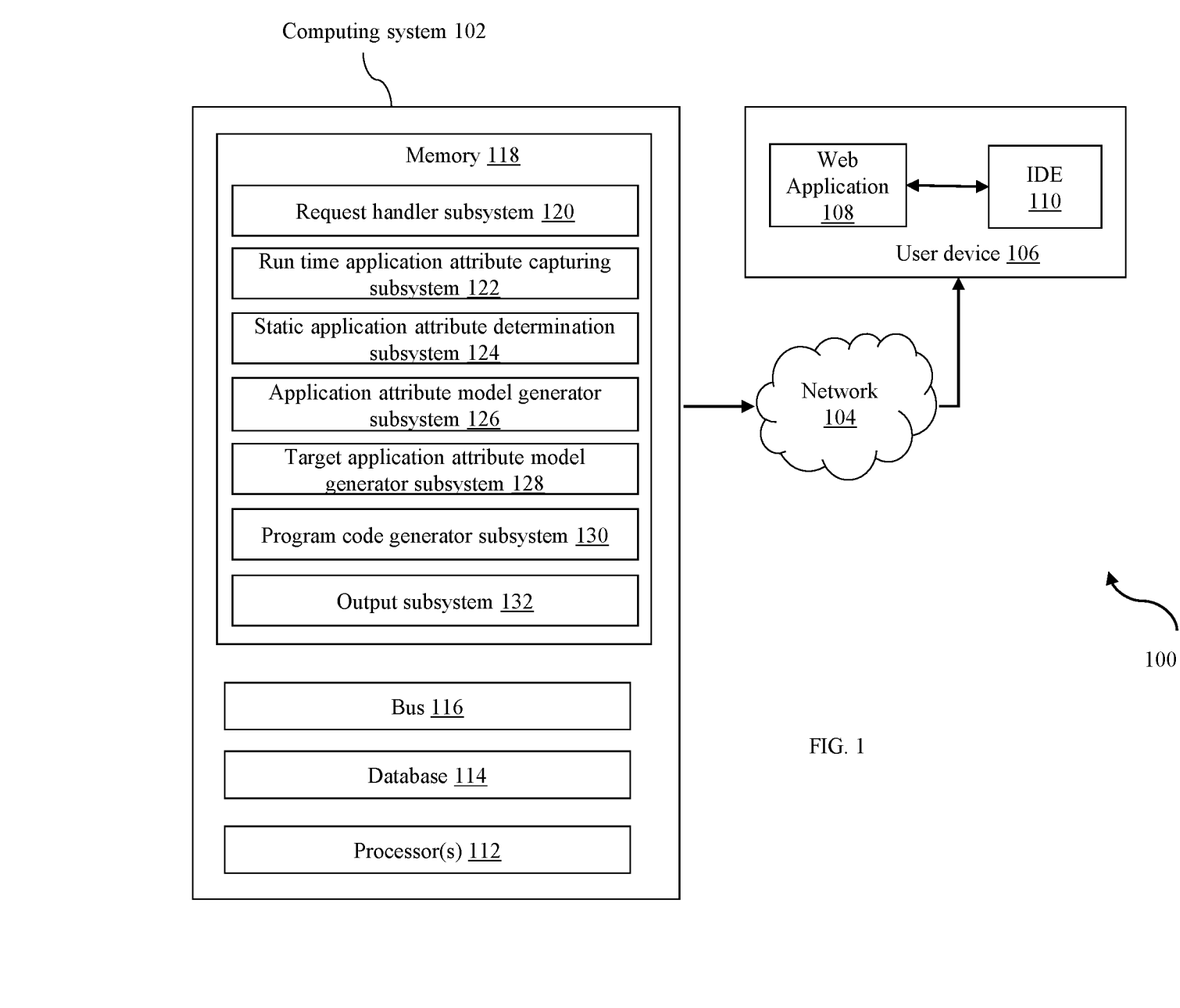
FIG. 1 is a block diagram illustrating an exemplary computing environment for accelerating modernization of user interfaces in accordance with an embodiment of the present disclosure.

FIG. 1 is a block diagram illustrating an exemplary computing environment 100 for accelerating modernization of user interfaces in accordance with an embodiment of the present disclosure. According to FIG. 1, the computing environment 100 comprises a computing system 102 which is capable of delivering web applications for managing an integrated development environment 110. Throughout the specification the term 'computing system' may also be referred as 'system' and the 'computing system'. The computing system 102 is connected to a web application 108 in the user device 106 via a network 104 (e.g., Internet). In one specific embodiment, the one or more communication networks 104 may include, but not limited to, an internet connection, a wireless fidelity (WI-FI) and the like. Although, FIG. 1 illustrates the computing system 102 connected to one user device 106, one skilled in the art can envision that the computing system 102 can be connected to several user devices located at different locations via the network 104. In an embodiment, the web application 108 may be hosted on a remote web server from where it is loaded on a "web browser" on the user device 106. In such case, the computing system 102 may be a remote web server.

In an embodiment, the computing system 102 may be a remote server, an edge device, a user device, a cloud server and the like.

The user devices 106 can be a laptop computer, desktop computer, tablet computer, smartphone and the like. The user device 106 can access cloud applications via a web browser. The user device 106 includes a web application 108 and an Integrated development environment 110. The web application 108 may be a web page that has client-side scripting language. In an embodiment, the web application 108 may be loaded onto the web browser of the user device 108 from the remote web server.

As an example, a user of a user device 106 may access a particular web application by launching a web browser, typing into the web browser's address bar a Uniform Resource Locator (URL) address for a web page whose rendering causes execution of a web application, and selecting an "enter" key on the user's keyboard. The web browser may send a Hypertext Transfer Protocol (HTTP) request over the internet for resources that correspond to the URL.

In response to the HTTP request, the web browser may receive from the computing system 102, a set of resources that the computing system 102 identified as relevant for the URL (e.g., HTML, for a web page, a CSS document, and a JavaScript file). The web browser may execute the resources, for example, by rendering a parent HTML file and executing other resources referenced therein. The execution of the resources may cause the web browser to effectively "display" the web application 108 on a display device of the user device 106.

The web application 108 may be a normal website that includes extra metadata that is installed as part of the browser application. Installable web apps may use standard web technologies for server-side and client-side code. Examples of web applications include office applications, games, photo editors, and video players that are run inside the browser.

In various examples, the web browser may include or be configured to interact with one or more browser extensions. In this context, a "browser extension" may include one or more web pages packaged or grouped together as a definable whole and configured to extend the functionality to the web browser. As described herein, "browser extensions" are small software programs that can modify and enhance the functionality of a web browser. They may be written using web technologies such as HTML, JavaScript, and CSS. Extensions may have little or no user interface. In some implementations, extensions may provide a small user interface icon or other user interface that may modify a browser's "chrome", which is defined herein to include an area outside of a webpage displayed in the browser (such as the borders of a web browser window, which include the window frames, menus, toolbars and scroll bars). Selecting the icon or the other user interface may activate the functionality of the extension within the browser. Extensions may include extra metadata that is associated with the application, which affects the web application's interaction with the browser application.

In a preferred embodiment, such extensions may be used for dynamically capturing the run time application attributes of the web application 108.

The web application 108 includes an interactive graphical user interface. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. Each of the graphical interface elements are referred to herein as the application objects.

The integrated development environment (IDE) 110 comprises tools for software development in a variety of different programming languages, such as Java, C++, and JavaScript. Examples of tools include source code editors, compilers, interpreters, build automation tools, and debuggers. Additionally, in accordance with embodiments of the present invention, the integrated development environment 110 may facilitate virtualization of an application across the computing system 102. In particular, the integrated development environment 110 can accept and accommodate plug-in tools that facilitate the deployment of applications in the computing environment 100. The IDE 110 may present the generated set of code to the user, who may then modify the received code, such as by way of the IDE 110.

The computing system 102 includes a processor 112, a database 114, and a memory 118. The processor 112, and the memory 114, may be communicatively coupled by a system bus such as a system bus 116 or a similar mechanism. The computing system 102 further includes a cloud interface, a server including hardware assets and an operating system (OS), a network interface, and application program interfaces (APIs). The cloud interface enables communication between the server and the user device 106. As used herein, "computing environment" refers to a processing environment comprising configurable computing physical and logical assets, for example, networks, servers, storage, applications, services, etc., and data distributed over the cloud platform. The computing environment 100 provides on-demand network access to a shared pool of the configurable computing physical and logical assets. The server may include one or more servers on which the OS is installed. The servers may comprise one or more processors, one or more storage devices, such as, memory units, for storing data and machine-readable instructions for example, applications and application programming interfaces (APIs), and other peripherals required for providing computing functionality.

The processor(s) 112, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The processor(s) 112 may also include embedded controllers, such as generic or programmable logic devices or arrays, application specific integrated circuits, single-chip computers, and the like.

The memory 118 may be non-transitory volatile memory and non-volatile memory. The memory 118 may be coupled for communication with the processor(s) 112, such as being a computer-readable storage medium. The processor(s) 112 may execute machine-readable instructions and/or source code stored in the memory 118. A variety of machine-readable instructions may be stored in and accessed from the memory 118. The memory 118 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 118 includes a plurality of subsystems stored in the form of machine-readable instructions on any of the above-mentioned storage media and may be in communication with and executed by the processor(s) 112.

The memory 118 includes a plurality of subsystems in the form of programmable instructions executable by one or more hardware processors 112. The plurality of subsystems includes a request handler subsystem 120 configured for receiving a request for upgrading a current graphical user interface corresponding to a current programming language and associated software framework to a target graphical user interface corresponding to a target programming language and associated software framework. The current graphical user interface is associated with the current web application 108. The current programming language and the associated software framework may be for example, but not limited to, a JavaScript programming language and Java user interface (UI) software framework. The software framework may be a user interface framework corresponding to the programming language. The target graphical user interface may be associated with a target web application (not shown). The target programming language and associated software framework may be for example, but not limited to, a JavaScript language and the AngularJS framework. The target graphical user interface may include improved view than the current graphical user interface.

The plurality of subsystem further includes a run time application attribute capturing subsystem 122 configured for capturing one or more run time application attributes associated with the current graphical user interface of the web application 108 during an ongoing communication session with one or more user devices 106. The one or more run time application attributes comprises graphical user interface elements, hierarchy of application objects, navigation with respect to user interaction with the graphical user interface elements, web page complexity, network invocations and the like. The ongoing communication session is an active session between the computing system 102 and the user device 106. The run time application attribute capturing subsystem 122 may use one or more browser extensions (as described above) for capturing the one or more run time application attributes. In capturing the one or more run time application attributes associated with the current graphical user interface, the run time application attribute capturing subsystem 122 is configured for detecting one or more actions performed at one or more application objects present at the current user interface. The one or more actions comprises user actions such as clicking an application object by the user, navigation paths during the use of the application, form elements, code that is executed during interactions, form element validation logic and the like. Further, the run time application attribute capturing subsystem 122 is configured for analyzing behavior of each of the one or more application objects during the one or more actions performed. For example, the behavior of each of the one or more application objects may be changing of color of the application object, navigating to a new web page, establishing or terminating the sessions, and the like. In an embodiment, if a user clicks (action) on an icon in the web application 108, the run time application attribute capturing subsystem 122 observes the behavior of the application objects in the web application 108 and records the same. Further, the run time application attribute capturing subsystem 122 is configured for determining the one or more run time application attributes associated with each of the one or more application objects based on the analyzed behavior. The one or more run time application attributes comprises behavioral attributes and the application object attributes. The behavioral attributes comprises in-page clicks, mouse movement, scroll depth, user navigation patterns, live visitors, recordings, site speed and the like. The application object attributes comprises size, color, placement and other design attributes.

Further, the run time application attribute capturing subsystem 122 is further configured for generating a run time attribute model for the determined one or more run time application attributes. The run time attribute model represents a hierarchical relationship between each of the determined one or more run time application attributes. For example, the run time attribute model may be a tree-based model representing the hierarchical relationship.

The plurality of subsystem further includes a static application attribute determination subsystem 124 configured for determining one or more static application attributes associated with the graphical user interface of the web application from one or more data sources. The one or more static application attributes corresponds to the current programming language and associated software framework. The one or more static application attributes comprises source code, source code, references to code/or business logic, business rules, code validations, alternate flows, and other static characteristics. The one or more static application attributes may conform to the current programming language, such as for example, source code in JavaScript. The one or more data sources may be a cloud database 114, any external databases or locally hosted databases on the user device 106. In determining the one or more static application attributes associated with the graphical user interface of the web application 108 from the one or more data sources, the static application attribute determination subsystem 124 is configured for extracting a source code associated with the current graphical user interface from the one or more data sources. The source code may be stored locally on the user device 106 or on any external data sources accessible by the computing system 102. The static application attribute determination subsystem 124 is configured for determining one or more static references associated with the current graphical user interface by applying one or more static analysis rules. The one or more static references may be references to business logic in the source code that is associated with runtime actions, call hierarchy, graph and the like. Further, the one or more static analysis rules comprises static code level metrics of code quality, complexity and re-usability and the like. Furthermore, the static application attribute determination subsystem 124 is configured for determining the one or more static application attributes associated with the current graphical user interface based on the extracted source code.

The plurality of subsystem further includes an application attribute model generator subsystem 126 configured for generating an application attribute model representing relationships between the one or more static application attributes and the one or more run time application attributes. The application attribute model corresponds to the current programming language and associated software framework.

The application attribute model may be a relationship matrix, a hierarchical tree structured model or any machine learning based or artificial intelligence-based model. The application attribute model depicts how the various application objects are correlated. The application attribute model also indicates the behavioural attributes, and the functional attribute depicting how each application object behaves and the function performed by each application object. In generating the application attribute model representing relationships between the one or more static application attributes and the one or more run time application attributes, the application attribute model generator subsystem 126 is configured for determining current programming language properties associated with the one or more run time application attributes and the one or more static application attributes. The current programming language properties comprises syntax, semantics, pragmatics, looping and branching, mark-up and control language, access to internal system variables, binary and text file I/O, ODBC/SQL support, access to files on the Internet, list processing and the like. Further, the application attribute model generator subsystem 126 is configured for modifying the current programming language properties to a common programming language format by mapping each of the one or more run time application attributes and the one or more static attributes with a corresponding pre-stored application language rules. For example, the common programming language format may be. The pre stored application language rules may be syntax-based rules, looping and branching rules, library rules and the like. In an embodiment, the current programming languages, for example, JavaScript may be converted into a common programming language format such as C language. Further, the application attribute model generator subsystem 126 is configured for correlating the one or more static attributes with the one or more run time application attributes based on the conversion. For example, each of the one or more static attributes is inter-related to each of the one or more run time application attributes. In an embodiment, context-based relationship is inferred from the one or more static attributes and the one or more run time application attributes. This may be achieved using for example any machine learning or artificial intelligence-based techniques. Further, the application attribute model generator subsystem 126 is configured for generating the application attribute model representing relationships between the one or more static application attributes and the one or more run time application attributes. The application attribute model is a declarative "technology agnostic" model in a language neutral representation such as JSON or XML consisting of all run time and static attributes.

The plurality of subsystem further includes a target application attribute model generator subsystem 128 configured for automatically generating a target application attribute model corresponding to the target programming language based on the generated application attribute model. The target application attribute model may be a relationship matrix, a hierarchical tree structured model or any machine learning based or artificial intelligence-based model. The target application attribute model depicts how the various target application objects are correlated. The target application attribute model also indicates the behavioural attributes, and the functional attribute depicting how each target application object behaves and the function performed by each target application object. The target application object are the GUI elements desired to be designed in the target graphical user interface. In an exemplary embodiment, the application attribute model is modified or transformed into the target application attribute model by transforming the run time and static application attributes from one programming language to other. In automatically generating the target application attribute model corresponding to the target programming language based on the generated application attribute model, the target application attribute model generator subsystem 128 is configured for determining type of target programming language to which the current programming language and associated software framework of the current graphical user interface is to be upgraded based on the received request. The request is parsed to determine the type of the target programming language and associated software framework. The request may include user selection indicating the target programming language or any other identifier. Further, the target application attribute model generator subsystem 128 is configured for determining programming language properties associated with the determined type of the target programming language. This determination may be made based on stored language models. Furthermore, the target application attribute model generator subsystem 128 is configured for generating a target run time application attributes and target static attributes corresponding to the target programming language based on the determined programming language properties. Furthermore, the target application attribute model generator subsystem 128 is configured for generating the target application attribute model corresponding to the target programming language by modifying the current one or more run time application attributes and the current one or more static application attributes in the application attribute model to the target run time application attributes and target static attributes.

The plurality of subsystem further includes a program code generator subsystem 130 configured for generating a set of executable program code corresponding to the target programming language based on the generated target application attribute model. The set of executable program code may include machine readable instructions for a programmable processor 112 configured for executing the web application 108. The set of executable program code comprises source code, object code, scripts for test cases, back-end service or API stubs, and non-code assets such as documentation, effort estimation models and the like. The set of executable program code may conform to the target programming language and associated software framework, such as for example, JavaScript, AngularJS and React. The set of executable program code are editable, compilable and deployable on any given software platform that the target programming language code and associated software framework is supported for. In generating a set of executable program code corresponding to the target programming language and associated software framework based on the generated target application attribute model, the program code generator subsystem 130 is configured for determining one or more application objects to be present in the target graphical user interface based on the generated target application attribute model. Furthermore, the program code generator subsystem 130 is configured for dynamically linking each of the determined one or more application objects with one or more actions based on the generated target application attribute model. For example, the home icon may be associated with an action of navigating the user back to the main page of the website. Furthermore, the program code generator subsystem 130 is configured for generating the set of executable program code and the non-executable assets for each of the one or more application objects to be present in the target programming language based on the dynamic link. The set of executable program code comprises executable source code, executable test cases and executable application libraries.

In an embodiment, the program code generator subsystem 130 leverages "adapters" for specific backend technologies (such as for example, Angular, React, Selenium) and hence provide extensibility to additional technologies in the future via custom generators.

Furthermore, the program code generator subsystem 130 is configured for generating one or more reference document files corresponding to the generated set of executable program code based on content, type and function of the program code.

In an embodiment, the program code generator subsystem 130 generates, for example, a scaffolded project for a given target programming language and associated software framework. Further, the program code generator subsystem 130 generates documentation using information captured in the model.

The plurality of subsystem further includes an output subsystem 132 configured for outputting the generated set of executable program code along with non-executable assets on a user interface of the user device 106. The set of executable program code may be displayed on the user interface of the user device 106. The non-executable assets may be documents and effort sizing assets.

Further, the plurality of subsystem further includes an identity management subsystem (not shown) to provide the capability to manage and authorize users for the API.

Further, the plurality of subsystem further includes a deployment subsystem (not shown) configured for deploying the generated set of executable program code at the one or more user devices connected via the network.

The plurality of subsystem further includes an application report generation subsystem (not shown) configured for identifying one or more application issues associated with the current graphical interface based on the generated application attribute model. The one or more application issues comprises programming issues, navigation issues, interaction issues, user interface elements issues and network invocation issues. The programming issues may be syntax issues, compatibility issues and the like. The navigation issues may be like circular and complex navigation'. The interaction issues may be like 'element not working', and the like. The user interface elements issues may be like accessibility related, regulatory best practices and the like. The network invocation issues may be like potential insecure usage. The application attribute model and the target application attribute model may be parsed, analysed and validated to check if there are any issues existing in any part of the web application 108. This process helps in identifying if there are any issues associated with the current graphical interface. If there are any issues identified, such issues may be appended on the respective application object present in either the application attribute model or the target application attribute model.

Further, the application report generation subsystem is configured for generating one or more web application reports associated with the current graphical interface. The one or more web application reports comprises the identified one or more application issues. The one or more web application reports are annotatable and downloadable onto the user device 106.

The database 114 stores the information relating to the web application 108 and the IDE 110. The database 114 is configured as a store of structured or unstructured data implemented in the computing environment 100, where web application 108 are delivered as a service over a network. The database 114, according to another embodiment of the present disclosure, is a location on a file system directly accessible by the plurality of subsystems. The database 114 is configured to store web application information, programming language information, graphical user interface information, user information and the like. In an embodiment, a document-oriented database such as Mongo may be used.

Those of ordinary skilled in the art will appreciate that the hardware depicted in FIG. 1 may vary for particular implementations. For example, other peripheral devices such as an optical disk drive and the like, Local Area Network (LAN), Wide Area Network (WAN), Wireless (e.g., Wi-Fi) adapter, graphics adapter, disk controller, input/output (I/O) adapter also may be used in addition or in place of the hardware depicted. The depicted example is provided for the purpose of explanation only and is not meant to imply architectural limitations with respect to the present disclosure.

Those skilled in the art will recognize that, for simplicity and clarity, the full structure and operation of all data processing systems suitable for use with the present disclosure is not being depicted or described herein. Instead, only so much of a computing system 102 as is unique to the present disclosure or necessary for an understanding of the present disclosure is depicted and described. The remainder of the construction and operation of the computing system 102 may conform to any of the various current implementation and practices known in the art.

Figure 2:
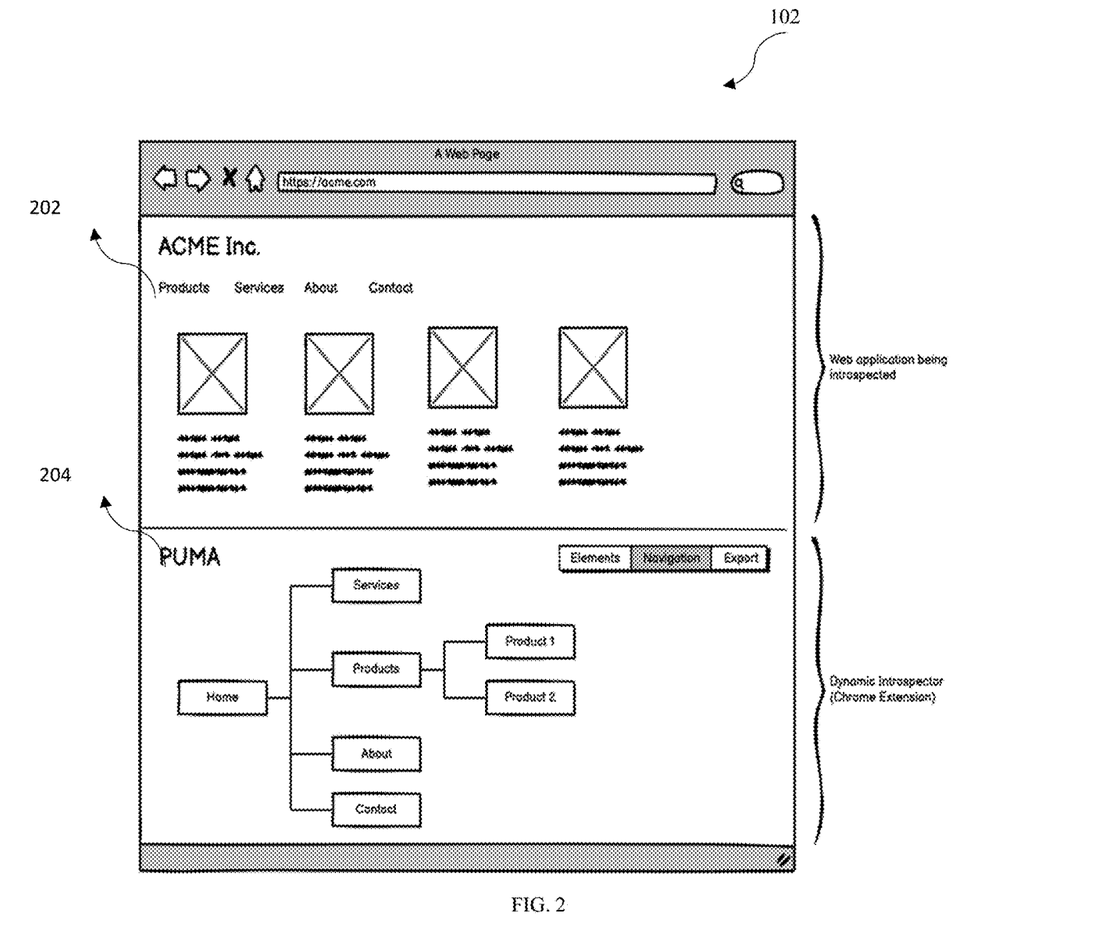
FIG. 2 is snapshot view of an exemplary web application running on a web browser of a user device, such as those shown in FIG. 1 in accordance with an embodiment of the present disclosure.

FIG. 2 is snapshot view of an exemplary web application running on a web browser of a user device, such as those shown in FIG. 1 in accordance with an embodiment of the present disclosure. In FIG. 2, a web application 202, such as the web application 108, running on a web browser is shown. The web application 202 comprises one or more application objects, such as 'products', 'services', 'about', 'contact' and the like. At the lower side of FIG. 2, a window of integrated development environment 204, such as the IDE 110, is shown. When the run time application attribute capturing system 122 captures the run time application attributes during an active session, the IDE 110 depicts such captured application attributes in the form of a model. This model may be the run time attribute model as described above. In an embodiment, the run time application attribute capturing system 122 captures the dynamic or runtime attributes, such as navigational characteristics of the web application 202 while being used in a browser such as a chrome browser. Further, the run time application attribute capturing system 122 allows a user to annotate and tag requirements of the web application 202 dynamically and with reduced effort in capturing and maintaining key details. Key user interface elements, such as the application objects, may be selected, annotated and marked for re-use by the analyst. The captured dynamic attributes are represented in a model that is further used by other subsystems to finally generate the code.

Figure 3:
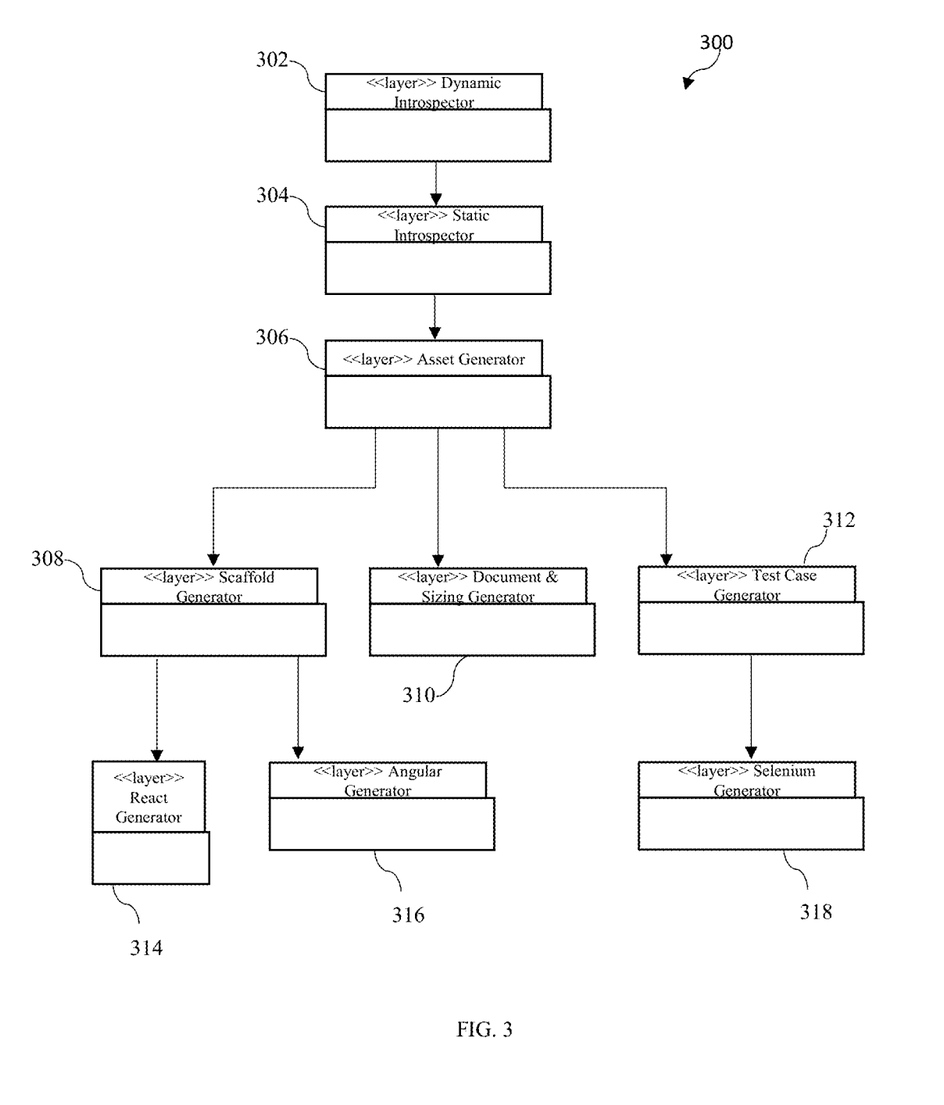
FIG. 3 is a structural view of the plurality of subsystems, such as those shown in FIG. 1, in accordance with an embodiment of the present disclosure.

FIG. 3 is a structural view 300 of the plurality of subsystems, such as those shown in FIG. 1, in accordance with an embodiment of the present disclosure. This view 300 depicts separation of responsibilities by layer comprising subsystems. A layer above only communicates with the layer below. The run time application attribute model of the web application 108 is used to represent state used by each layer for performing its responsibility. Each layer communicates with the layer below using an interface, to insulate change and support extensibility and modifiability of its implementation. Each state is an internal application state of the solution as required to implement the functionality.

Figure 4:
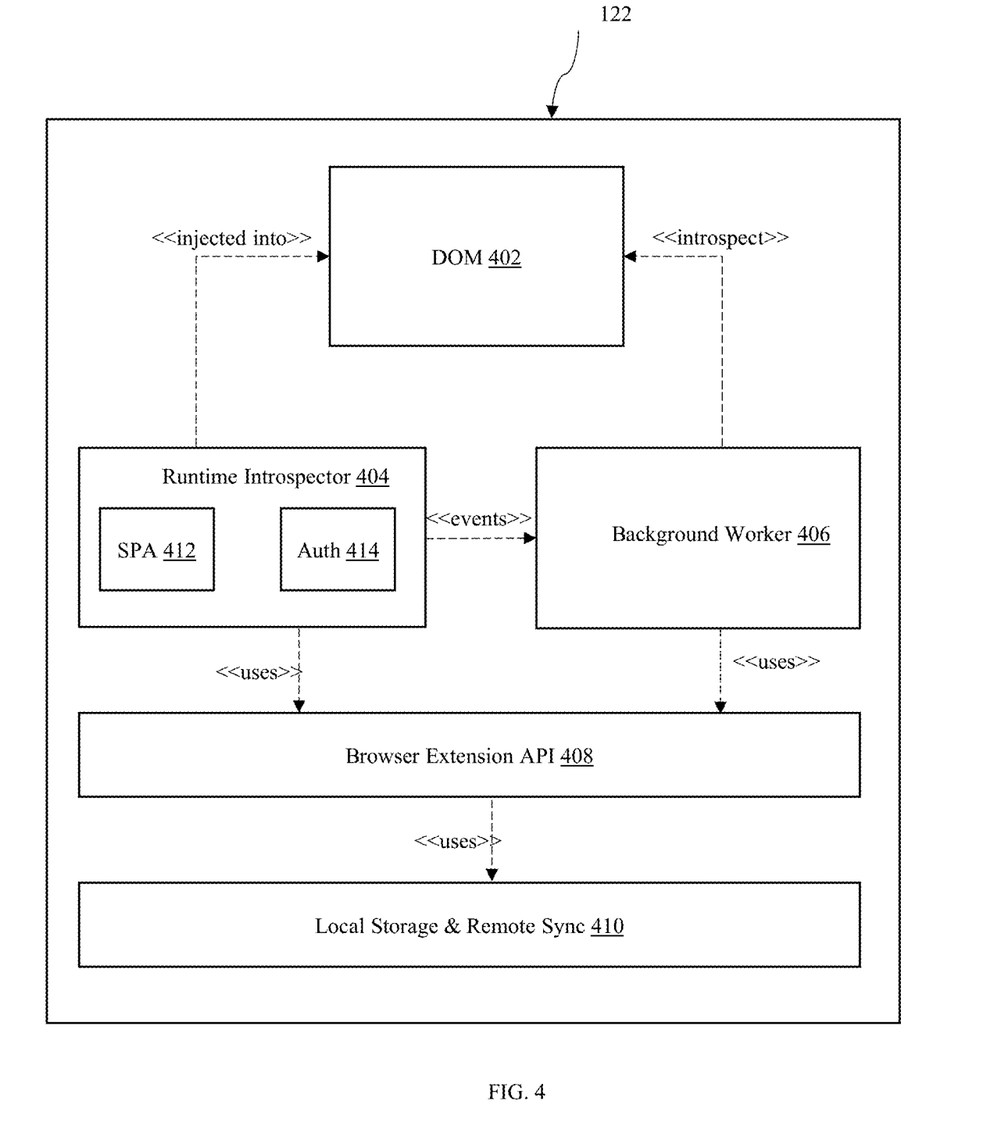
FIG. 4 is a block diagram illustrating a detailed view of a run time application attribute capturing subsystem such as those shown in FIG. 1, in accordance with an embodiment of the present disclosure.

FIG. 4 is a block diagram illustrating a detailed view of a run time application attribute capturing subsystem 122 such as those shown in FIG. 1, in accordance with an embodiment of the present disclosure. The run time application attribute capturing subsystem 122 comprises a Single Page Application (SPA) and security modules for authentication and authorization. The SPA is the single page application that provide the micro-UI in the browser to support the functionality of runtime attribute collection on the browser. The security modules are used to authorize and authenticate this component with the backend. The runtime application attribute capturing subsystem 122 is injected into data object model (DOM) of an active tab in the web browser. The runtime application attribute capturing subsystem 122 captures runtime attributes such as user interface element selection and hierarchy, navigation map, call-backs to user actions, application programming interface (API) calls to backend, and the like. These attributes are sent to a background worker using browser messaging API for further introspection of the application object or call. The runtime application attribute capturing subsystem 122 also comprises a local storage for storing the run time application attribute model, run time application attributes and other data. The run time application attribute capturing subsystem 122 is configured for transparently capturing the runtime attributes of the web application 108, allows selection, annotation, grouping of elements to capture relationships and maintain the representation in a model.

Figure 5:
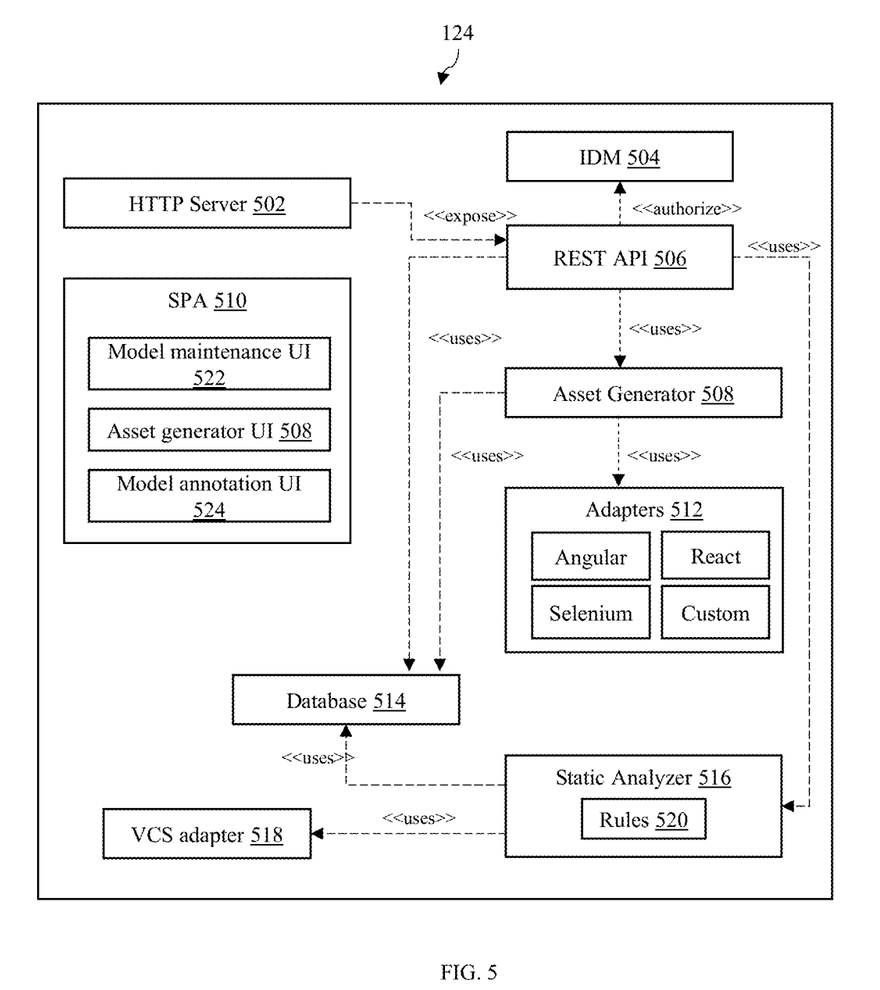
FIG. 5 is a block diagram illustrating a detailed view of a static application attribute determination subsystem such as those shown in FIG. 1, in accordance with an embodiment of the present disclosure.

FIG. 5 is a block diagram illustrating a detailed view of a static application attribute determination subsystem 124 such as those shown in FIG. 1, in accordance with an embodiment of the present disclosure. The static application attribute determination subsystem 124 comprises server component that hosts the SPA and exposes a REST API for consumption by the run time application attribute capturing subsystem 122. This is designed for standalone use on a single machine as well as being extensible for a networked multi-user setup supporting multiple client devices. The design leverages the following abstractions for technology agnosticity, portability, and extensibility. For example, the RESTful API to the run time application attribute capturing subsystem 122 insulates any technology dependency on its implementation. In an embodiment, Node.js and Express may be used to host this runtime. This is the interface for the SPA. The SPA is hosted by Express, however also supports standalone hosting of static content (via nginx, Apache, S3 and the like). The static application attribute determination subsystem 124 is configured for identifying static application attributes such as re-usable components, code complexity and sizing metrics. The static application attribute determination subsystem 124 establishes a relationship between component action and the source code for developer productivity migration.

Figure 6:
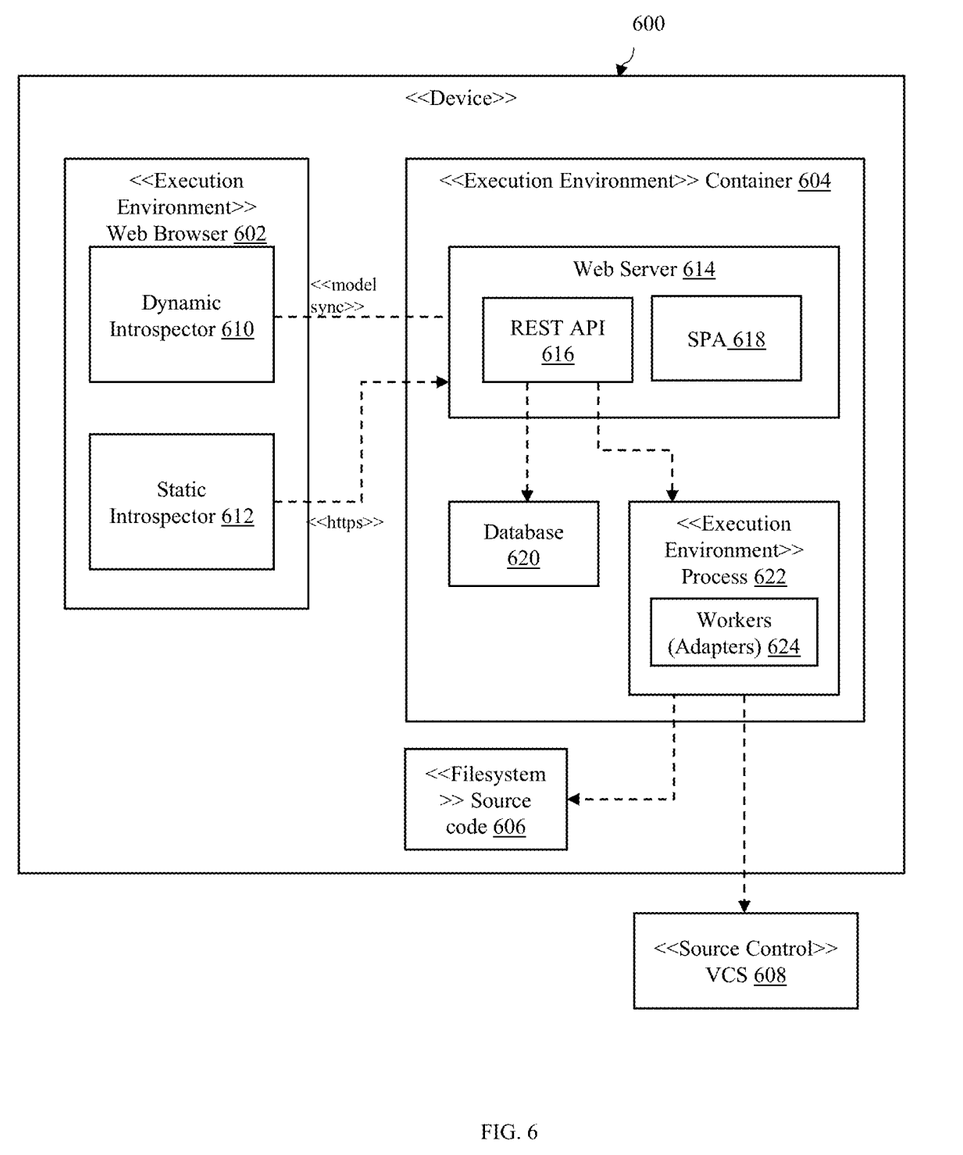
FIG. 6 is a block diagram illustrating an exemplary modernization environment deployed in a user device for accelerating modernization of user interfaces from a single user configuration perspective, in accordance with an embodiment of the present disclosure.

FIG. 6 is a block diagram illustrating an exemplary modernization environment 600 deployed in a user device for accelerating modernization of user interfaces from a single user configuration perspective, in accordance with an embodiment of the present disclosure. In an embodiment, the modernization environment 600 may be designed to be hosted on a single computer for single-user operation. The server component may be containerized for ease of use, portability, runtime simplification and standardization. The static application attribute such as the source code is referenced either via references to the local filesystem or via git version control. For longer running components in the static application attribute determination subsystem 124, worker processes are used for better user experience and responsiveness of the UI. In an exemplary embodiment of a single user configuration, the document-oriented database (Mongo) is included in a Docker container to ease setup, and portability of the runtime components.

Figure 7:
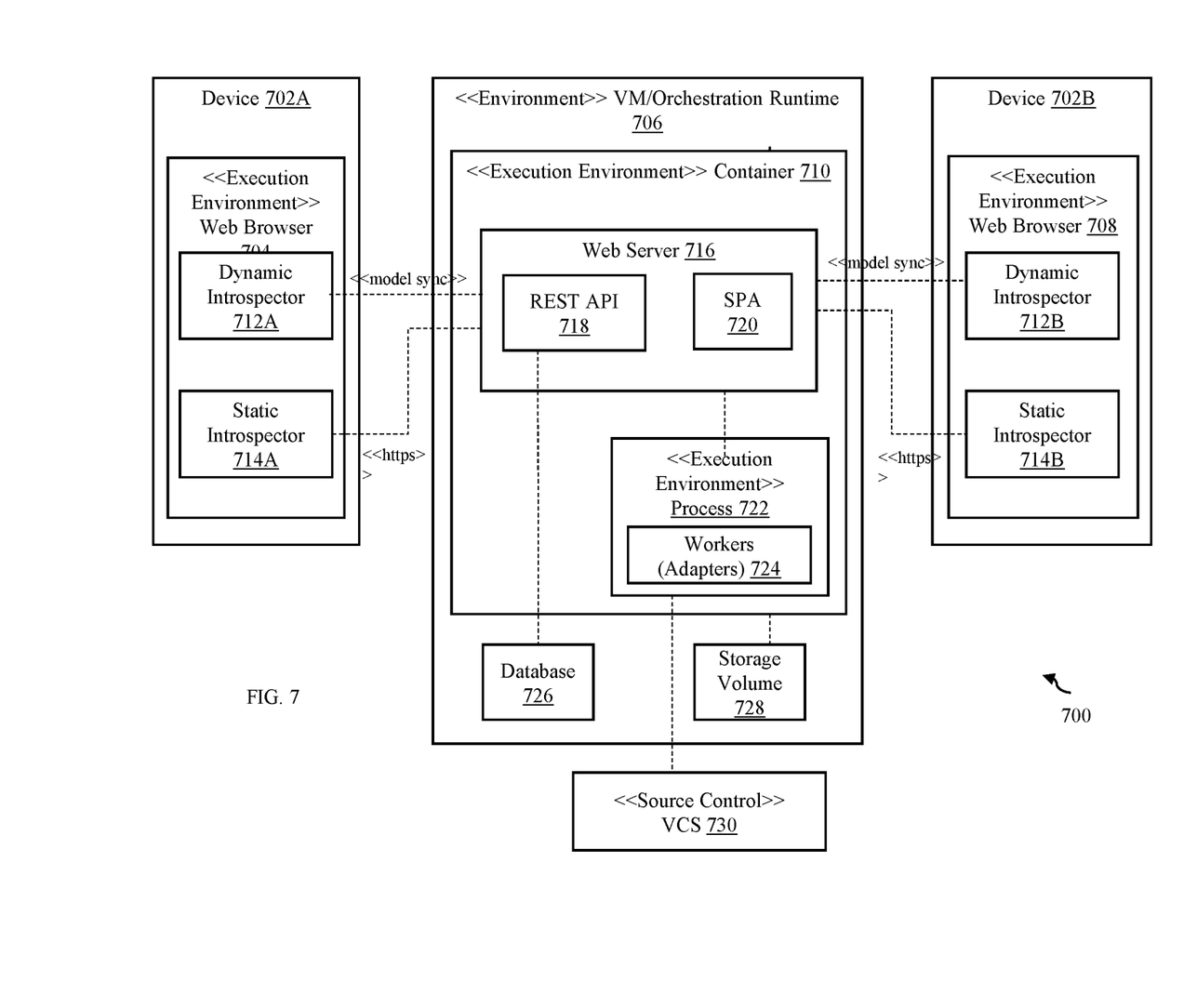
FIG. 7 is a block diagram illustrating an exemplary modernization environment deployed in multiple user devices for accelerating modernization of user interfaces from a multiuser configuration perspective, in accordance with an embodiment of the present disclosure.

FIG. 7 is a block diagram illustrating an exemplary modernization environment 700 deployed in multiple user devices for accelerating modernization of user interfaces from a multiuser configuration perspective, in accordance with an embodiment of the present disclosure. In an embodiment, the modernization environment 700 may be designed to address issues of scalability and extensibility of this architecture to networked multi-user configurations.

In an exemplary embodiment, the same components used in standalone mode may be extended to a networked configuration by deploying the Docker container in either virtual machines or orchestration environments such as OpenShift or Kubernetes. In this configuration, the document-oriented database (Mongo) may either be local to the container or external depending on scalability needs. This supports the horizontal scaling of the Node.js or Express components. In a container orchestrated environment, a persistent storage volume shall be shared by all the containers for storage of source and analysis assets.

Figure 8:
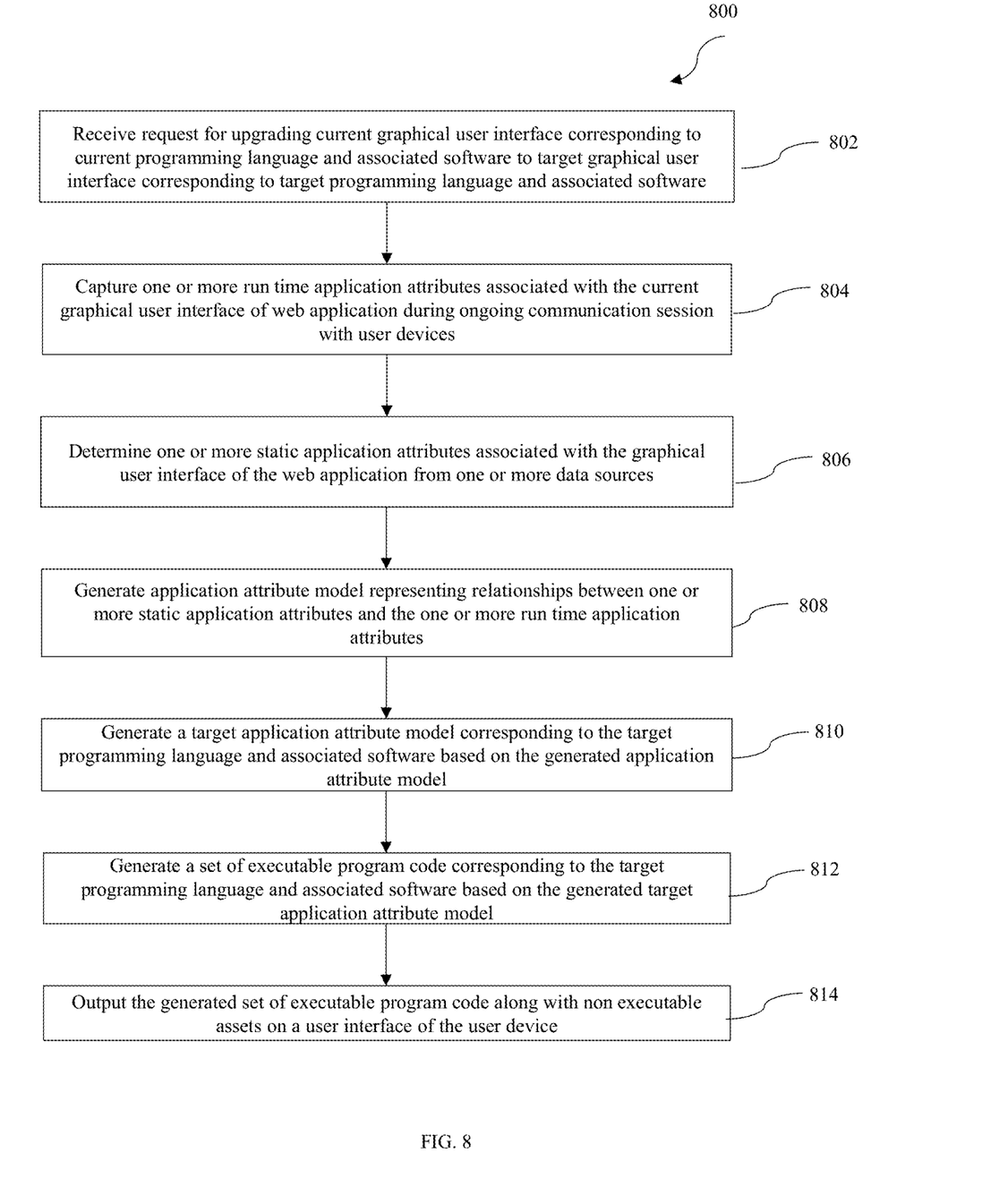
FIG. 8 is a process flow diagram illustrating an exemplary method for managing computing assets in accordance with an embodiment of the present disclosure.

FIG. 8 is a process flow diagram illustrating an exemplary method 800 for managing computing assets in accordance with an embodiment of the present disclosure. At step 802, a request for upgrading a current graphical user interface corresponding to a current programming language and associated software framework to a target graphical user interface corresponding to a target programming language and associated software framework is received. At step 804, one or more run time application attributes associated with the current graphical user interface of a web application 108 is captured during an ongoing communication session with one or more user devices 106. At step 806, the one or more static application attributes associated with the graphical user interface of the web application 108 is determined from one or more data sources. The one or more static application attributes corresponds to the current programming language and associated software framework. At step 808, an application attribute model representing relationships between the one or more static application attributes and the one or more run time application attributes is generated. The application attribute model corresponds to the current programming language and associated software framework. At step 810, a target application attribute model corresponding to the target programming language and associated software framework is automatically generated based on the generated application attribute model. At step 812, a set of executable program code corresponding to the target programming language and associated software framework is generated based on the generated target application attribute model. At step 814, the generated set of executable program code and non-executable assets are output on a user interface of the user device 106.

Further, the method 800 includes validating the generated set of executable program code based on one or more predefined validation rules. Also, the method 800 includes deploying the generated set of executable program code at the one or more user devices 106 connected via the network 104.

Further, the method 800 includes identifying one or more application issues associated with the current graphical interface based on the generated application attribute model. The one or more application issues comprises programming issues, navigation issues, interaction issues, user interface elements issues and network invocation issues. Further, the method 800 includes generating one or more web application reports associated with the current graphical interface. The one or more web application reports comprises the identified one or more application issues.

In capturing the one or more run time application attributes associated with the current graphical user interface of the web application 108 during the ongoing communication session with one or more user device 106, the method 800 includes detecting one or more actions performed at one or more application objects present at the current user interface. The method 800 further includes analysing behaviour of each of the one or more application objects during the one or more actions performed. Also, the method 800 further includes determining the one or more run time application attributes associated with each of the one or more application objects based on the analysed behaviour. The one or more run time application attributes comprises behavioural attributes and the application object attributes. The method 800 also includes generating a run time attribute model for the determined one or more run time application attributes. The run time attribute model represents a hierarchical relationship between each of the determined one or more run time application attributes.

In determining the one or more static application attributes associated with the graphical user interface of the web application 108 from the one or more data sources, the method 800 includes extracting a source code associated with the current graphical user interface from the one or more data sources. The method 800 further includes determining one or more static references associated with the current graphical user interface by applying one or more static analysis rules. Also, the method 800 further includes determining the one or more static application attributes associated with the current graphical user interface based on the extracted source code.

In generating the application attribute model representing relationships between the one or more static application attributes and the one or more run time application attributes, the method 800 includes determining current programming language and associated software framework properties related to one or more run time application attributes and the one or more static application attributes. Further, the method 800 includes modifying the current programming language and associated software framework properties to a common programming language format by mapping each of the one or more run time application attributes and the one or more static attributes with a corresponding pre-stored application language rules. Furthermore, the method 800 includes correlating the one or more static attributes with the one or more run time application attributes based on the conversion. Further, the method 800 includes generating the application attribute model representing relationships between the one or more static application attributes and the one or more run time application attributes.

In automatically generating the target application attribute model corresponding to the target programming language and associated software framework based on the generated application attribute model, the method 800 includes determining type of target programming language and associated software framework to which the current programming language and associated software framework associated with the current graphical user interface is to be upgraded based on the received request. The method 800 includes determining programming language properties associated with the determined type of the target programming language and associated software framework. The method 800 includes generating a target run time application attributes and target static attributes corresponding to the target programming language and associated software framework based on the determined programming language properties. Further, the method 800 includes generating the target application attribute model corresponding to the target programming language by modifying the current one or more run time application attributes and the current one or more static application attributes in the application attribute model to the target run time application attributes and target static attributes.

In generating a set of executable program code corresponding to the target programming language and associated software framework based on the generated target application attribute model, the method 800 includes determining one or more application objects to be present in the target graphical user interface based on the generated target application attribute model. The method 800 includes dynamically linking each of the determined one or more application objects with one or more actions based on the generated target application attribute model. The method 800 further incudes generating the set of executable program code and non-executable assets for each of the one or more application objects to be present in the target programming language and associated software framework based on the dynamic link. The set of executable program code comprises executable source code, executable test cases and executable application libraries. The method 800 includes generating one or more reference document files corresponding to the generated set of executable program code based on content, type and function of the program code.

Various embodiments of the present system provide a technical solution to the problem of migrating from a legacy user interface technology to a newer one faster through automation and intelligent attribute capture. The present system provides browser-based toolchain to capture an application's functionality, navigation, validations, and re-usable components, automatically to generate code, documentation, and test case assets.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

The invention claimed is:

1. A system for accelerating modernization of user interfaces in a computing environment, the system comprising:
one or more hardware processors; and a memory coupled to the one or more hardware processors, wherein the memory comprises a plurality of subsystems in the form of programmable instructions executable by the one or more hardware processors, wherein the plurality of subsystem comprises:
a request handler subsystem configured for receiving a request for upgrading a current graphical user interface corresponding to a current programming language and an associated software framework to a target graphical user interface corresponding to a target programming language and an associated software framework;
a run time application attribute capturing subsystem configured for capturing one or more run time application attributes associated with the current graphical user interface of a web application during an ongoing communication session with one or more user devices;
a static application attribute determination subsystem configured for determining one or more static application attributes associated with the graphical user interface of the web application from one or more data sources, wherein the one or more static application attributes corresponds to the current programming language and the associated software framework;
an application attribute model generator subsystem configured for generating an application attribute model representing relationships between the one or more static application attributes and the one or more run time application attributes, wherein the application attribute model corresponds to the current programming language and the associated software framework;
a target application attribute model generator subsystem configured for automatically generating a target application attribute model corresponding to the target programming language and the associated software framework based on the generated application attribute model;
a program code generator subsystem configured for generating a set of executable program code corresponding to the target programming language and the associated software framework based on the generated target application attribute model; and
an output subsystem configured for outputting the generated set of executable program code along with non-executable assets on a user interface of the user device.

2. The system of claim 1, wherein the system further comprises:
a validation subsystem configured for validating the generated set of executable program code based on one or more predefined validation rules; and
a deployment subsystem configured for deploying the generated set of executable program code at the one or more user devices connected via the network.

3. The system of claim 1, wherein the system further comprises an application report generation subsystem configured for:
identifying one or more application issues associated with the current graphical interface based on the generated application attribute model, wherein the one or more application issues comprises programming issues, navigation issues, interaction issues, user interface elements issues and network invocation issues; and
generating one or more web application reports associated with the current graphical interface, wherein the one or more web application reports comprises the identified one or more application issues.

4. The system of claim 1, wherein in capturing the one or more run time application attributes associated with the current graphical user interface of the web application during the ongoing communication session with one or more user devices, the run time application attribute capturing subsystem is configured for:
detecting one or more actions performed at one or more application objects present at the current user interface;
analyzing behavior of each of the one or more application objects during the one or more actions performed; and
determining the one or more run time application attributes associated with each of the one or more application objects based on the analyzed behavior, wherein the one or more run time application attributes comprises behavioral attributes and the application object attributes.

5. The system of claim 4, wherein the run time application attribute capturing subsystem is further configured for:
generating a run time attribute model for the determined one or more run time application attributes, wherein the run time attribute model represents a hierarchical relationship between each of the determined one or more run time application attributes.

6. The system of claim 1, wherein in determining the one or more static application attributes associated with the graphical user interface of the web application from the one or more data sources, the static application attribute determination subsystem is configured for:
extracting a source code associated with the current graphical user interface from the one or more data sources;
determining one or more static references associated with the current graphical user interface by applying one or more static analysis rules; and
determining the one or more static application attributes associated with the current graphical user interface based on the extracted source code.

7. The system of claim 1, wherein in generating the application attribute model representing relationships between the one or more static application attributes and the one or more run time application attributes, the application attribute model generator subsystem is configured for:
determining the current programming language and the associated software framework properties associated with the one or more run time application attributes and the one or more static application attributes;
modifying the current programming language and the associated software framework properties to a common programming language format by mapping each of the one or more run time application attributes and the one or more static attributes with a corresponding pre-stored application language rules;
correlating the one or more static attributes with the one or more run time application attributes based on the conversion; and
generating the application attribute model representing relationships between the one or more static application attributes and the one or more run time application attributes.

8. The system of claim 1, wherein in automatically generating the target application attribute model corresponding to the target programming language and the associated software framework based on the generated application attribute model, the target application attribute model generator subsystem is configured for:
determining type of target programming language and the associated software framework to which the current programming language and the associated software framework of the current graphical user interface is to be upgraded based on the received request;

determining programming language properties associated with the determined type of the target programming language;

generating a target run time application attributes and target static attributes corresponding to the target programming language and the associated software framework based on the determined programming language properties; and generating the target application attribute model corresponding to the target programming language and the associated software framework by modifying the current one or more run time application attributes and the current one or more static application attributes in the application attribute model to the target run time application attributes and target static attributes.

9. The system of claim 1, wherein in generating a set of executable program code corresponding to the target programming language and the associated software framework based on the generated target application attribute model, the program code generator subsystem is configured for:

determining one or more application objects to be present in the target graphical user interface based on the generated target application attribute model;

dynamically linking each of the determined one or more application objects with one or more actions based on the generated target application attribute model; and generating the set of executable program code and non-executable assets for each of the one or more application objects to be present in the target programming language and the associated software framework based on the dynamic link, wherein set of executable program code comprises executable source code, executable test cases and executable application libraries.

10. The system of claim 1, wherein the program code generator subsystem is configured for:

generating one or more reference document files corresponding to the generated set of executable program code based on content, type and function of the program code.

11. A method for accelerating modernization of user interfaces in a computing environment, the method comprising:

receiving, by a processor, a request for upgrading a current graphical user interface corresponding to a current programming language and associated software framework to a target graphical user interface corresponding to a target programming language and associated software framework;

capturing, by the processor, one or more run time application attributes associated with the current graphical user interface of a web application during an ongoing communication session with one or more user devices;

determining, by the processor, one or more static application attributes associated with the graphical user interface of the web application from one or more data sources, wherein the one or more static application attributes corresponds to the current programming language and the associated software framework;

generating, by the processor, an application attribute model representing relationships between the one or more static application attributes and the one or more run time application attributes, wherein the application attribute model corresponds to the current programming language and the associated software framework;

automatically generating, by the processor, a target application attribute model corresponding to the target programming language and the associated software framework based on the generated application attribute mode;

generating, by the processor, a set of executable program code corresponding to the target programming language and the associated software framework based on the generated target application attribute model; and outputting, by the processor, the generated set of executable program code along with non-executable assets on a user interface of the user device.

12. The method of claim 11, further comprising:

validating the generated set of executable program code based on one or more predefined validation rules; and deploying the generated set of executable program code at the one or more user devices connected via the network.

13. The method of claim 11, further comprising:

identifying one or more application issues associated with the current graphical interface based on the generated application attribute model, wherein the one or more application issues comprises programming issues, navigation issues, interaction issues, user interface elements issues and network invocation issues; and generating one or more web application reports associated with the current graphical interface, wherein the one or more web application reports comprises the identified one or more application issues.

14. The method of claim 11, wherein capturing the one or more run time application attributes associated with the current graphical user interface of the web application during the ongoing communication session with one or more user devices comprises:

detecting one or more actions performed at one or more application objects present at the current user interface;

analyzing behavior of each of the one or more application objects during the one or more actions performed; and determining the one or more run time application attributes associated with each of the one or more application objects based on the analyzed behavior, wherein the one or more run time application attributes comprises behavioral attributes and the application object attributes.

15. The method of claim 14, further comprising:

generating a run time attribute model for the determined one or more run time application attributes, wherein the run time attribute model represents a hierarchical relationship between each of the determined one or more run time application attributes.

16. The method of claim 11, wherein determining the one or more static application attributes associated with the graphical user interface of the web application from the one or more data sources comprises:

extracting a source code associated with the current graphical user interface from the one or more data sources;

determining one or more static references associated with the current graphical user interface by applying one or more static analysis rules; and determining the one or more static application attributes associated with the current graphical user interface based on the extracted source code.

17. The method of claim 11, wherein generating the application attribute model representing relationships between the one or more static application attributes and the one or more run time application attributes comprises:

determining the current programming language and the associated software framework properties associated with the one or more run time application attributes and the one or more static application attributes;

modifying the current programming language and the associated software framework properties to a common programming language format by mapping each of the one or more run time application attributes and the one or more static attributes with a corresponding pre-stored application language rules;

correlating the one or more static attributes with the one or more run time application attributes based on the conversion; and generating the application attribute model representing relationships between the one or more static application attributes and the one or more run time application attributes.

18. The method of claim 11, wherein automatically generating the target application attribute model corresponding to the target programming language and the associated software framework based on the generated application attribute model comprises:

determining type of target programming language and the associated software framework to which the current programming language and the associated software framework of the current graphical user interface is to be upgraded based on the received request;

determining programming language properties associated with the determined type of the target programming language;

generating a target run time application attributes and target static attributes corresponding to the target programming language and the associated software framework based on the determined programming language properties; and generating the target application attribute model corresponding to the target programming language and the associated software framework by modifying the current one or more run time application attributes and the current one or more static application attributes in the application attribute model to the target run time application attributes and target static attributes.

19. The method of claim 11, wherein generating a set of executable program code corresponding to the target programming language and the associated software framework based on the generated target application attribute model comprises:

determining one or more application objects to be present in the target graphical user interface based on the generated target application attribute model;

dynamically linking each of the determined one or more application objects with one or more actions based on the generated target application attribute model; and generating the set of executable program code and non-executable assets for each of the one or more application objects to be present in the target programming language and the associated software framework based on the dynamic link, wherein set of executable program code comprises executable source code, executable test cases and executable application libraries.

20. A non-transitory computer-readable storage medium having instructions stored therein that when executed by a hardware processor, cause the processor to perform method steps comprising:

receiving a request for upgrading a current graphical user interface corresponding to a current programming language and associated software framework to a target graphical user interface corresponding to a target programming language and associated software framework;

capturing one or more run time application attributes associated with the current graphical user interface of a web application during an ongoing communication session with one or more user devices;

determining one or more static application attributes associated with the graphical user interface of the web application from one or more data sources, wherein the one or more static application attributes corresponds to the current programming language and the associated software framework;

generating an application attribute model representing relationships between the one or more static application attributes and the one or more run time application attributes, wherein the application attribute model corresponds to the current programming language and the associated software framework;

automatically generating a target application attribute model corresponding to the target programming language and the associated software framework based on the generated application attribute mode;

generating, by the processor, a set of executable program code corresponding to the target programming language and the associated software framework based on the generated target application attribute model; and outputting the generated set of executable program code along with non-executable assets on a user interface of the user device.

\* \* \* \* \*